United States Patent [19]

Shimura et al.

[11] Patent Number: 4,610,255
[45] Date of Patent: Sep. 9, 1986

[54] ULTRASONIC NON-LINEAR PARAMETER MEASURING SYSTEM

[75] Inventors: Takaki Shimura, Machida; Keiichi Murakami; Hirohide Miwa, both of Kawasaki; Takuso Sato, Shinagawa; Nobuyuki Ichida, Machida, all of Japan

[73] Assignee: Fujitsu Limited, Kawasaki, Japan

[21] Appl. No.: 675,612

[22] Filed: Nov. 28, 1984

[30] Foreign Application Priority Data

Dec. 2, 1983 [JP] Japan ................................. 58-227949
May 30, 1984 [JP] Japan ................................. 59-109831

[51] Int. Cl.⁴ ............................................. A61B 10/00
[52] U.S. Cl. ..................................................... 128/660
[58] Field of Search ................... 128/660; 73/596–597, 73/599, 602

[56] References Cited

U.S. PATENT DOCUMENTS 4,431,008  2/1984  Wanner et al. ...................... 128/660
4,513,749  4/1985  Kino et al. ........................... 128/660
4,546,772  10/1985  Flax ..................................... 128/660
4,566,460  1/1986  Sato et al. ........................... 128/660

OTHER PUBLICATIONS

Proceedings 1st International Symposium on Medical Imaging and Image Interpretation ISMIII '82, vol., 375, IEEE Computer Society, SPIE-The International Society for Optical Engineering, 26th-28th Oct. 1982, pp. 454–459, Berlin, DE; T. Sato et al.: "Nonlinear Parameter Tomography, Active Incoherent Imaging and Adaptive Imaging for Ultrasonic Tissue Characterization".
The Journal of the Acoustical Society of Japan, vol. 39, No. 8, Aug. 1983, pp. 521–530, Acoustical Society of Japan, Tokyo, JP; N. Ichida et al. "Nonlinear Parameter Tomography".
The Journal of the Acoustic Society of America, vol. 74, No. 5, Nov. 1983, Acoustical Society of America, pp. 1518–1521, New York, US; Zheming Zhu et al.: "Determination of the Acoustic Nonlinearity Parameter B/A from Phase Measurements".
Abstract of New Technology-from the Air Force Systems Command, 10th Nov. 1981, Project No. F49620-7-9-C-0217, Washington, D.C., (US); G. S. Kino et al.: "Remote Three-Dimensional Temperature Probing".
Journal of the Acoustical Society of America, vol. 45, No. 5, May 1969, pp. 1251–1257, New York, US; R. C. Williamson: "Echo Phase-Comparison Technique and Measurement of Sound Velocity in Water".
1972 Ultrasonics Symposium Proceedings, IEEE Group on Sonics and Ultrasonics, 4th-7th, Oct. 1972, Boston, Mass., pp. 54–58, New York, US; T. D. Sachs et al.: "Thermo-Acoustic Sensing Technique—Tast".

Primary Examiner—Kyle L. Howell
Assistant Examiner—Francis J. Jaworski
Attorney, Agent, or Firm—Staas & Halsey

[57] ABSTRACT

This invention relates to a system for measuring the non-linear parameter B/A of an ultrasonic medium such as a living tissue, namely the value which indicates a rate of change of the sound velocity with change of pressure, utilizing reflected ultrasonic waves. In this invention, a measuring burst pulse, having a comparatively high frequency, and a pumping pulse, having a comparatively low frequency and a high sound pressure, for giving a change of pressure are transmitted in the same direction while they are superposed, the phase of the reflected waves from each region of the ultrasonic medium is detected as a function of time, and it is then differentiated. Thereby, the distribution of B/A along the transmitting direction of said pulses can be obtained.

12 Claims, 39 Drawing Figures t OR z

ULTRASONIC NON-LINEAR PARAMETER MEASURING SYSTEM

BACKGROUND OF THE INVENTION

This invention relates to an apparatus for measuring the distribution of non-linear parameters of an ultrasonic wave medium, and particularly to a measuring apparatus in the system for measuring the space distribution of the physical characteristics of an ultrasonic wave medium such as a living tissue, etc., wherein the space distribution of the non-linear parameters is measured as a characteristic value of the medium and moreover wherein such space distribution is visualized at a high speed and with ease as required, by making use of such non-linear characteristics as that the sound velocity is constant with respect to variation in sound pressure in the primary approximation, but is proportional to the sound pressure in the secondary approximation. Moreover, this invention relates particularly to an apparatus wherein said non-linear parameters can be measured by the reflection method instead of the so-called transmission method.

The principle of the non-linear visualization method used in this invention is described in detail in the Japanese Patent Application No. 58-399073 (U.S. Ser. No. 587,522, filed Mar. 8, 1984 and now U.S. Pat. No. 4,566,460) and Japanese Patent Application No. 58-119100. In the former case, the non-linear parameter B/A defined below has been obtained at high speed on the measuring ultrasonic beam scanning line by causing a comparatively low frequency flat pulse for pumping to orthogonally cross a comparatively high frequency continuous ultrasonic beam for measurement, and by phase-demodulating the phase-modulated measuring wave by the pumping pulse. In the latter case, almost the same type of pumping pulse is received at almost all parts of the measuring beam, and the effect of eliminating a mechanically large structure can be obtained by providing the pumping pulse in such a way that it is concentric to the measuring beam and travels in the opposite direction as the measuring beam.

However, these methods all employ the transmission method wherein the signal is generated from a transducer for sending a measuring ultrasonic wave which is thereafter received by a transducer for receiving the measuring signal after it passes through the medium to be measured. An attempt to obtain a tomographic image in the actual clinical application has been accompanied by major operating problems, such as being limited only to breasts wherein the observing area can be set between the transducers for, or such as the area to be observed must be scanned with the transducers for measurement by surrounding such area by a water pillow.

Moreover, the ultrasonic wave is reflected from an area having a bone or a cavity, and thereby observation by the transmission method has been difficult.

SUMMARY OF THE INVENTION

It is an object of this invention to obtain the distribution of the non-linear parameter by the reflection method.

It is another object of this invention to provide a method of obtaining the values of the non-linear parameter by the reflection method with a high accuracy.

This invention discloses that a burst pulse wave is transmitted from a transmitting/receiving transducer or from a pair of transmitting and receiving transducers for measuring the ultrasonic waves, instead of using a continuous wave as the measuring wave, wherein a comparatively low frequency ultrasonic wave pulse for pumping is transmitted into a medium to be observed from almost the same place and in the same direction as said ultrasonic wave pulse for measurement, the drive timing of a vibration unit is adjusted so that a burst wave for measurement is superposed on a high sound pressure part (or low pressure part) of a pumping wave as shown in FIG. 1, the difference between (1) the phase of the received signal of the measuring pulse which has returned by reflection when the measuring pulse is transmitted superposed on the particular phase location of the pumping pulse and (2) the phase of the receiving signal of the measuring pulse which has returned by reflection when only the measuring pulse is transmitted, or when it is transmitted superposed on another particular phase located of the pumping pulse. Thereby, the phase modulation of the measuring pulse as a result of only the effect of the pumping pulse is detected by the reflection method, and thusly the non-linear parameter B/A in the medium being observed is obtained.

This invention is intended to obtain the distribution of the non-linear parameter B/A by differentiating a phase signal obtained through discrimination of the receiving signal by utilizing the fact that a point focused on the travelling measuring wave receives phase modulation, while such point reaches a reflecting body, detemined by an integral value of (1) a product of a non-linear parameter B/A (spatial function) of the region in which said measuring pulse has passed and (2) a sound pressure P (spatial function depending on the effect of attenuation) of the pumping wave.

DESCRIPTION OF PREFERRED EMBODIMENTS

If the sound velocity, for when sound pressure within an ultrasonic wave medium is zero, is $C_o$, and density is $\rho_o$, then the sound velocity C when a sound pressure P is applied can be expressed as follows.

$$C = C_o + 1/(2\rho_o C_o) \times (B/A) \times P \tag{1}$$

wherein, $B/A = 2\rho_0 C_0 (\partial C/\partial P)_s$, the subscript s indicating that the partial derivative is with respect to equal entropy.

Therefore, the sound velocity C changes as much as indicated below due to a sound pressure P of the pumping pulse.

$$\Delta C = 1/(2\rho_0 C_0) \times (B/A) \times P \qquad (2)$$

Figure 2:
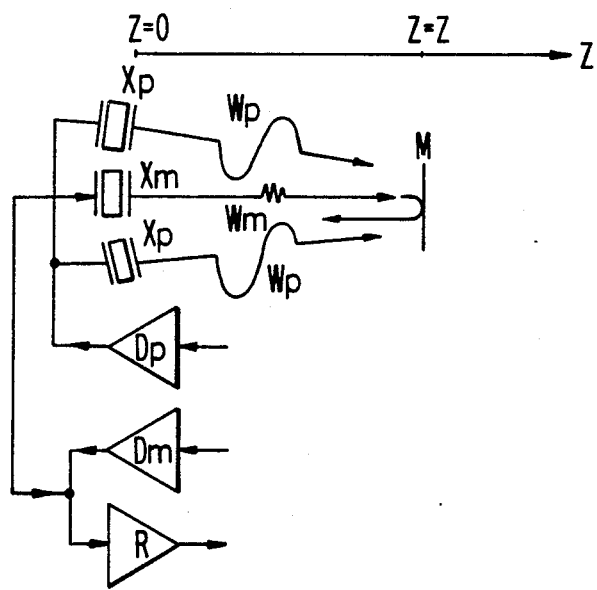

Considered here is the case, as shown in FIG. 2, wherein an ultrasonic burst pulse $W_m$ is transmitted into a measuring medium in the Z-axis direction of the figure, from a transducer $X_m$ for measurement placed at the position $Z=0$, and a reflected wave from a reflecting body M is received. At this time, a transducer $X_p$ for the pumping pulse is placed in almost the same location as the transducer $X_m$ for the measuring pulse $W_m$, transmits the pumping pulse $W_p$ in the Z-axis direction as shown in the figure. For convenience of explanation, the pulses $W_p$ and $W_m$ are considered as being superposed on each other. The sound pressure of $W_m$ is provided to be sufficiently low as compared with that of $W_p$ as that it is enough to consider only the pressure of $W_p$ as that corresponding to P in the equations (1) and (2). When the measuring pulse $W_m$ reaches a reflecting body such a body M at $Z=Z_m$, it receives a change of sound velocity indicated below which is different depending on the location according to the equation (2) for each value of Z, $$\Delta C(Z) = 1/(2\rho_0 C_0) \times (B/A(Z)) \times P(Z) \qquad (3)$$

wherein the quantities B/A and P are each represented as a respective function of depth Z.

Accordingly, the measuring pulse receives a change of phase, which changes in accordance with depth and is proportional to $\Delta C(Z)$. Namely, the phase advance in such a place where the sound velocity is high, and the phase lags in such a place where the sound velocity is low. Therefore, by the time the measuring pulse $W_m$ has reached a reflecting body M, it has a change of phase $\phi(Z)$ which is proportional to the integral of the change of the sound velocity indicated by the equation (3) (as compared with the case where it does not receive a change of sound velocity or a change due to B/A).

$$\phi(Z) = K \int_0^Z \Delta C(Z) \, dz \qquad (4)$$

$$= K \int_0^Z (\tfrac{1}{2}\rho_0 C_0) \times (B/A(Z)) \times P(Z) \, dz$$

Wherein, K is a proportional constant.

Up until being received by a transducer $X_m$, after being reflected by M, there is no pumping pulse (more accurately, a reflected wave of the pumping pulse returns together with the reflected pulse of measuring pulse, but since the reflectivity of a medium is generally small as the frequency becomes low, the sound pressure of the reflected wave is sufficiently low as compared with that of transmitted wave), and therefore $\phi(Z)$ indicated by the equation (4) can be obtained by phase demodulation the reflected measuring pulse received by the transducer $X_m$.

The equation (5) can be obtained as indicated below by differentiating $\phi(Z)$ with respect to Z.

$$d\phi(Z)/dz = K(\tfrac{1}{2}\rho_0 C_0) \times (B/A(Z)) \times P(Z) \qquad (5)$$

The left side of equation (5) is a value obtained by actual measurement, while K, $\rho_0$, $C_0$ in the right side are constants. Accordingly, B/A (Z) can be obtained by knowing the value of P(Z). As examples of ultrasonic wave frequencies, the frequency about 500 kHz which does not show too large an attenuation within living tissue is used as the pumping pulse $W_p$, while the frequency of about 5 MHz which is higher by one digit than said pumping pulse is used as the measuring pulse $W_m$. It is known that such an ultrasonic wave for measuring is attenuated by 1 dB/MHz/cm within living tissue and, in the case of the pumping wave $W_p$ of 500 kHz, that it is attenuated by about 0.5 dB/cm. Accordingly, P(Z) can be approximated by using the equation (6) indicated below as the P(Z) of equation (5).

$$P(Z) = P(O) \times 10^{-(0.5Z/20)} \qquad (6)$$

where, the unit of Z is cm.

In this case, from the equation (5), $$B/A(Z) = (d\phi(Z)/dZ) \times (2\rho_0 C_0/K) \times (1/P(o)) \times 10^{(0.5Z/20)} \qquad (7)$$

$$= K'e^{+\alpha z}(d\phi(Z)/dZ)$$

where, $K' = 2\rho_0 C_0/KP(O)$ and $\alpha = (0.5Z/20) \log_e 10$.

Namely, the value of B/A (Z) can be obtained by multiplying a coefficient $K'e^{+\alpha z}$ which may increase with distance Z to a value obtained by differentiating a phase demodulation output $\phi(Z)$.

Figure 3:
FIG. 3 shows a graph indicating the operation of the TGC.

If it is supposed that attenuation in the living tissue is fixed to 1 dB/MHz/cm in any location therein, it goes without saying that the TGC (Time Gain Control) which is capable of freely giving the gain as shown in FIG. 3 for each distance Z can be used as is often used in the ordinary B mode tomographic image apparatus. This gain curve is obtained on the basis of trial and error while monitoring the result of measurement.

When an average sound velocity in the medium is $C_o$, Z almost becomes equal to $C_o t$ (t being the time after the ultrasonic wave is transmitted) and $dZ = C_o dt$. Therefore, $$d\phi(Z)/dZ = (1/C_o) \times (d\phi(Z)/dt) \qquad (8)$$

Naturally, differentiation of equation (5) by Z can be replaced with time differentiation.

As described above, a phase $\phi(Z)$ of the reflected wave from a reflecting body M separated by the distance Z can be obtained, but actually it is not easy because of the following reasons.

Figure 4:
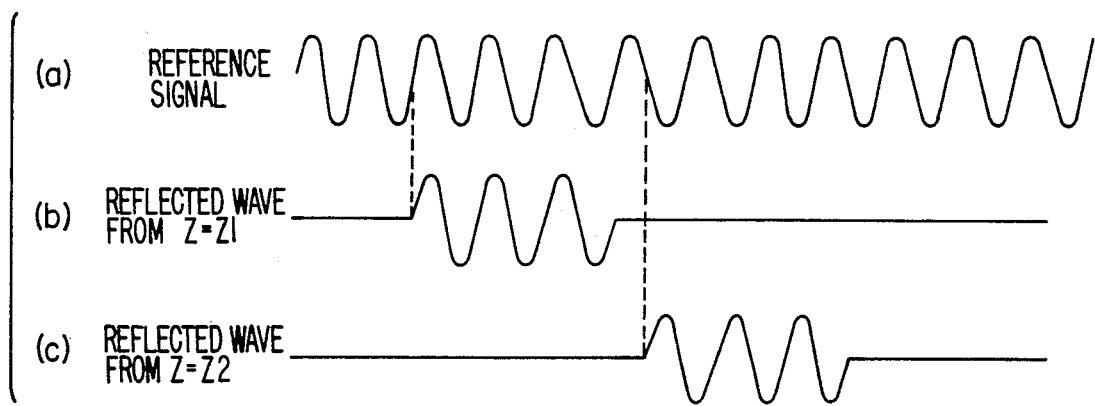
FIGS. 4(a) to 4(c) and FIGS. 5(a) to 5(c) show the phases of the reflected waves.

Firstly, phase comparison between the reference signal shown in FIG. 4(a) and the received signal is carried out for detecting the phase. In the case of the reflection method, as shown in FIGS. 4(b) and (c), the phase of the received signal with respect to the reference signal changes largely only by the phase difference due to the distance between the transducer and the reflecting body, and the phase shift due to the effect of (B/A(Z)) P(Z) is hidden.

Figure 5:
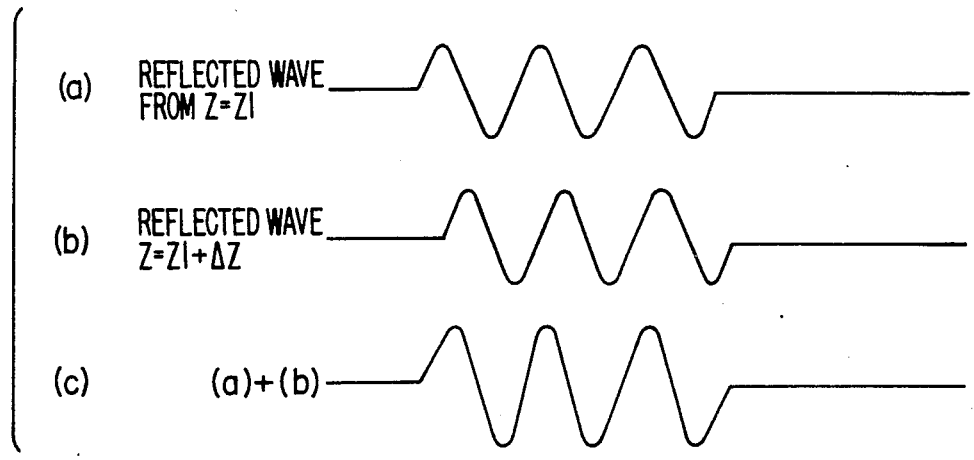

Secondly, the individual reflected waves from different depths in a living tissue are often superposed on each other, as indicated by FIGS. 5(a) and 5(b), and the combined received signal FIG. 5(c) has a phase which is largely different from the individual signals, so that the phase shift due to the effect of (B/A(Z)) P(Z) is also hidden.

From the above reasons, on the occasion of employing the reflection method, it is essential for practical measurement to obtain the difference between the phase of the received signal when the measuring pulses are repeatedly transmitted in overlap with a particular phase location of the pumping pulse, and the phase of the receiving signal when only the measuring pulse is transmitted without sending the pumping pulse, or when it is repeatedly transmitted in overlap with another particular phase of the pumping pulse. As shown in FIG. 4(a) to FIG. 5(c), since change of phase due to transmission or pulse superposition appears in the same way both when the pumping pulse exists or does not exist (the transmitting period of the pumping pulse is about 200 μsec and therefore it is possible to think that any change does not occur during such a short period), a change of phase $\phi(Z)$ due only to the effect of (B/A(Z)) P(Z) can be extracted without any effect of transmission or pulse super-position by obtaining the difference in phase after storing the phase demodulation outputs of the respective cases.

Figure 6A:
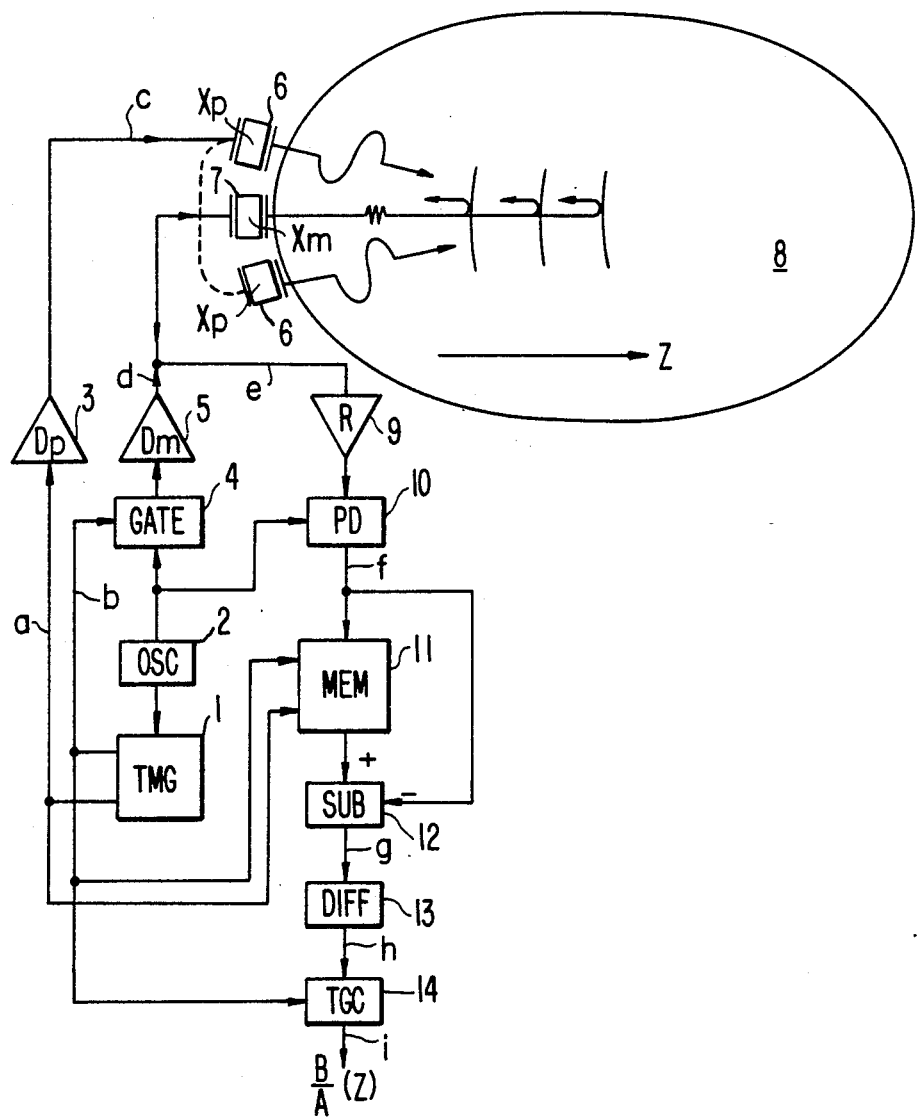
FIG. 6(a) is a block diagram of an embodiment of this invention.
Figure 6B:
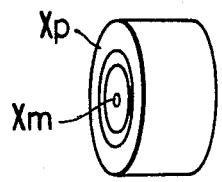
FIGS. 6(b) and 6(c) are a perspective view and a cross-sectional view of the transducer in the embodiment of this invention, respectively.
Figure 6C:
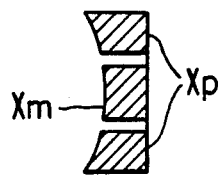

The constitution of an embodiment is explained by referring to FIGS. 6(a) to 6(c).

Figure 1:
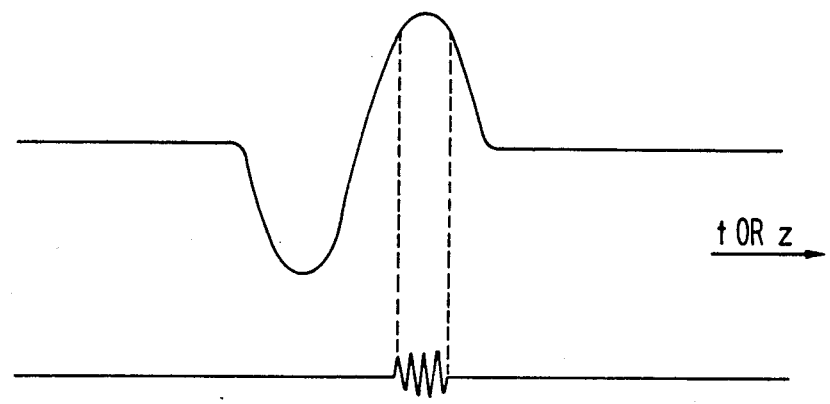
FIGS. 1(a) and 1(b) and FIG. 2 show the principle of this invention.
Figure 7:
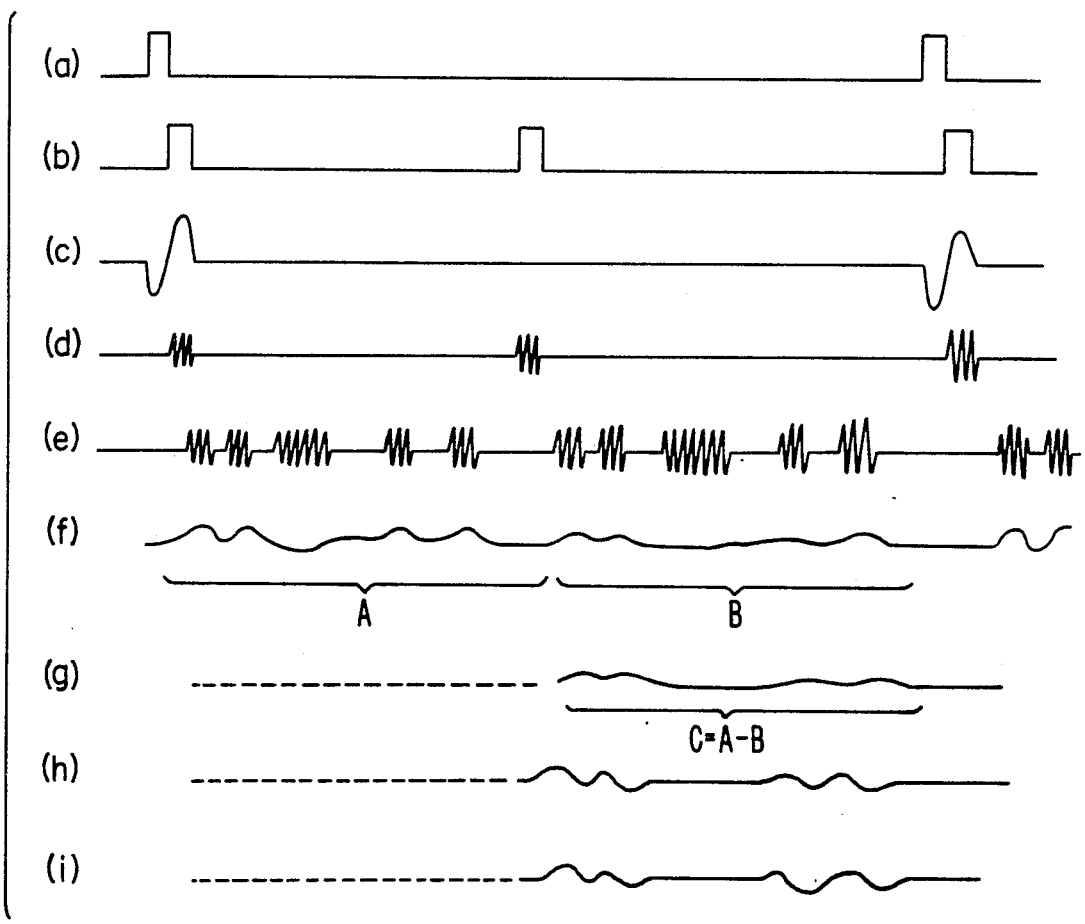
FIGS. 7(a) to 7(i) show the waveforms of each part of FIG. 6A.

In FIG. 6(a), 1 is a timing control part which generates the timing for sending the pumping pulse. 2 is a continuous wave oscillator for the measuring burst pulse. 3 is a driver for the pumping pulse. 4 is a gate circuit for extracting an output of the oscillator 2 so that the measuring burst pulse is superposed on a particular phase of the pumping pulse usually at the (phase wherein the sound pressure is maximum or minimum). 5 is a driver for driving a transducer for measurement. 6 is a transducer for generating the pumping pulse. 7 is a transducer for generating the measuring pulse. 8 is an ultrasonic medium to be measured. 9 is a receiving amplifier. 10 is a phase detector. 11 is a memory for temporarily storing an output of the phase detector 10. 12 is a subtraction circuit for subtracting an output of the phase detector 10 from the output of the memory 11. 13 is a differential circuit. 14 is a so-called TGC circuit. The TGC circuit can be installed in any desired stage after the receiving amplifier 9, and is thus not limited only to the stage shown in the figure. FIGS. 6(b) and (c) respectively show the perspective view and cross-sectional view of the illustrated example of the transducers 6 and 7. FIGS. 7(a) to (i) show the time waveforms at the principal part of FIG. 6A. When a pulse as in FIG. 7(a) is given to the driver 3 for the pumping pulse, the waveform of FIG. 7(c) is applied to the transducer 6 for generating the pumping pulse. Meanwhile, an output of the continuous wave oscillator 2 is extracted only for the timing of FIG. 7(b) wherein the measuring pulse is sent, for example, only in overlap with a high sound pressure part of the pumping pulse by the gate circuit 4, and a drive signal is then applied to the transducer 7 for the measurement of FIG. 6(a) passing the driver 5. As a result, the pumping pulse and the measuring pulse travel in the medium to be measured 8 of FIG. 6(a) while keeping such a relation of timing, for example, as shown in FIG. 1. The reflected wave from the medium to be measured is received by the transducer 7 and is then amplified by the receiving amplifier 9 as shown in FIG. 7(e) and is finally applied to the phase detection circuit 10. The output of the continuous wave oscillator 2 is applied to one input of the phase detection circuit as the reference signal, and the phase difference between these two inputs is output from the phase detection circuit 10 and is sent to the memory circuit 11 as shown in FIG. 7(f).

As the trigger signal, the pumping wave drive timing and gate timing of FIGS. 7(a) and 7(b) are applied to the memory circuit 11. The signal is stored for the period indicated by A in FIG. 7(f) of the scanning line from the gate timing, just after the pumping wave drive timing and a memory content is extracted by the next gate timing pulse and is then sent to the subtraction circuit 12. The subtraction circuit 12 subtracts an output corresponding to part B of FIG. 7(f) of the phase detection circuit 10 from an output part A in FIG. 7(f) of the memory circuit 11, and thereby the difference between the outputs of the phase detection circuit when the pumping wave exists and when it does not exist is obtained as shown in FIG. 7(g). It is then sent to the TGC circuit 14 through a differential circuit.

The gate timing signal of FIG. 7(b) is applied as the trigger signal to the TGC circuit 14 and the output of FIG. 7(h) of the differential circuit 13 of FIG. 6(a) is amplified, for example, in such a manner as changing with time as shown in FIG. 3, in synchronization with transmission of the measuring pulse. Thereby, the final output B/A (Z) can be obtained as shown in FIG. 7(i).

The memory circuit 11 may be an analogous memory using a delay line such as BBD (bucket brigade device) or a CCD (charge coupled device), etc. or a digital memory combining an A/D converter and a memory or a shift register, or a random access memory.

As described above, according to this invention, the space distribution of the non-linear parameter B/A (Z) of an ultrasonic medium is obtained by the reflection method in place of the existing transmission method. Accordingly, a mechanical structure such as a water tank which is required for the transmission method is no longer necessary, the medium can be observed from various angles, and operability can be drastically improved.

Figure 8:
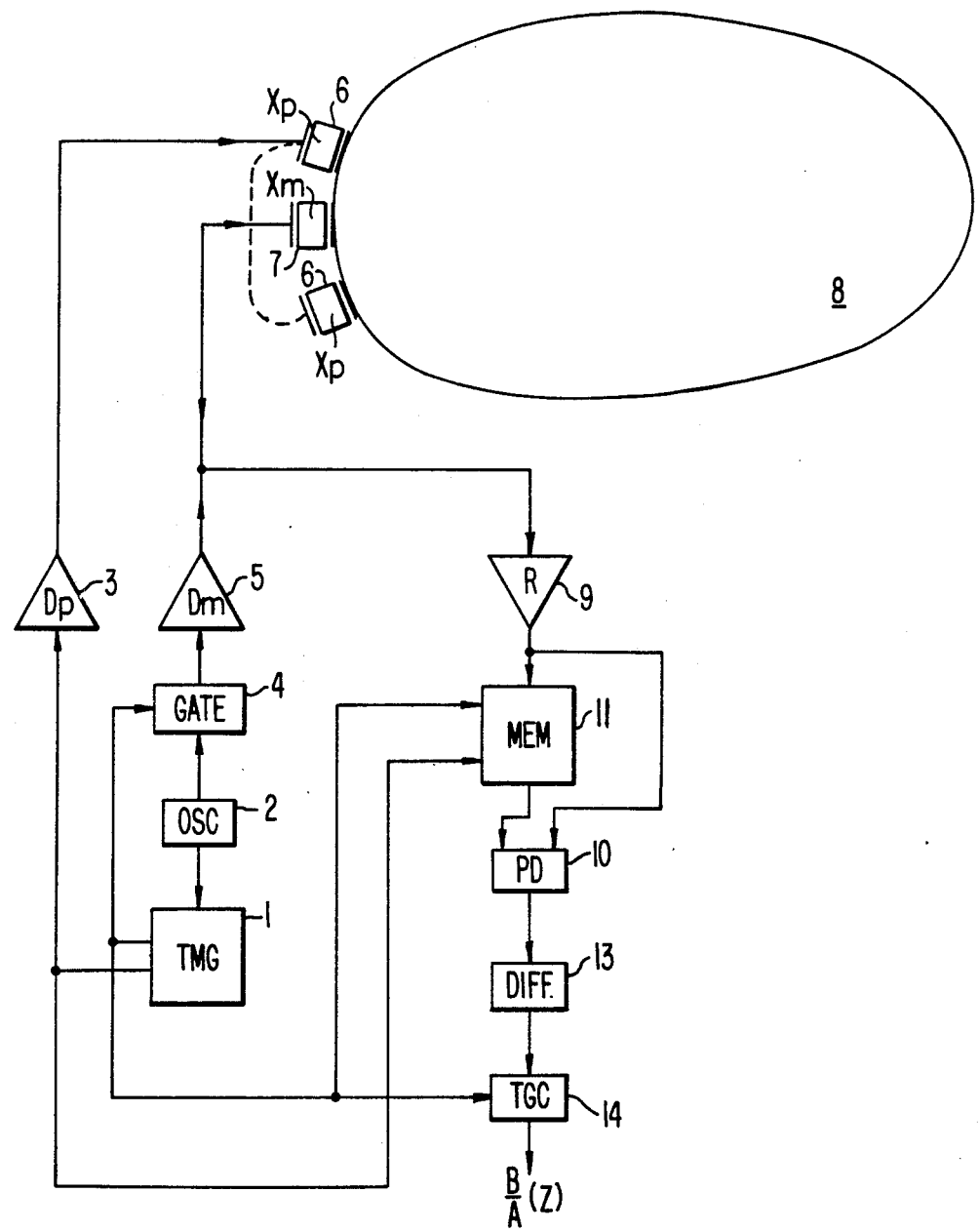
FIG. 8 is a block diagram of another embodiment of this invention.

In the above embodiment, a phase difference is obtained, as between the cases where the pumping pulse exists or does not exist, by subtraction between the results of the phase detection. However, in the following embodiment it has been attempted to obtain a phase difference of the receiving signal, in the cases where the pumping wave exists or does not exist, by direct comparison of the phases between the receiving RF signal when the pumping wave exists and the receiving RF signal when the pumping wave does not exist. The embodiment is shown in FIG. 8. In FIG. 8, the same component elements as those in FIG. 6(a) are given the same numbering, and further explanation of them is omitted. The difference from FIG. 6(a) is that the sequence of the phase detection circuit 10 and the memory circuit 11 is inverted and the subtraction circuit 12 is eliminated. In case the constitution of FIG. 8 is employed, the memory circuit 11 requires a high speed analog (such as a CCD device) or digital memory (combining an AD converter and a memory or shift register) which is sufficient for directly storing the RF receiving signal. The system operation of FIG. 8 can easily be estimated from the operation indicated by FIGS. 7(a) to (i).

Figure 9:
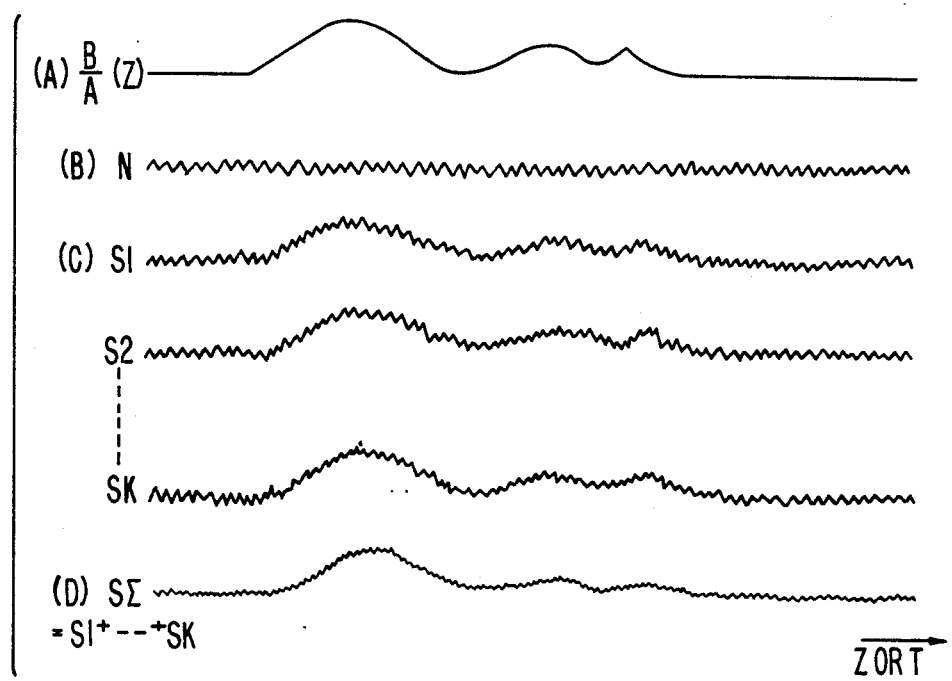
FIGS. 9(a) to 9(d) and FIG. 10 show further embodiments of this invention.

A means for improving the S/N of the B/A (Z) distribution will now be explained. When the change of the phase of the measuring pulse indicated by the product of the non-linear parameter and the sound pressure is small, the noise generated in the respective circuit cannot be neglected for the intrinsic change of phase $\phi(Z)$. Moreover, $\phi(Z)$ is differentiated for obtaining B/A (Z), and this differential operation also has a large noise level. Accordingly, the B/A (Z) that is obtained easily contains noise. This is shown in FIGS. 9(a) to (d). When the noise N of FIG. 9(b) is added to the noise-free B/A (Z) output shown in FIG. 9(a), the signal shown in FIG. 9(c) is output.

When the same region is measured K times, the signals including noise such as $S_1$ to $S_k$ shown in FIG. 9(c) are obtained, and these are added for each point of the same Z coordinate as the measure of the phenomenon, and the amplitude of each signal is multiplied by K at each point. But the noise element is only multiplied by K in terms of a power. Namely, the noise is random noise, the amplitude of the noise at each point is only multiplied by $\sqrt{K}$. Accordingly, the S/N is improved by $\sqrt{K}$ times and an output shown in FIG. 9(d) can be obtained.

Figure 10:
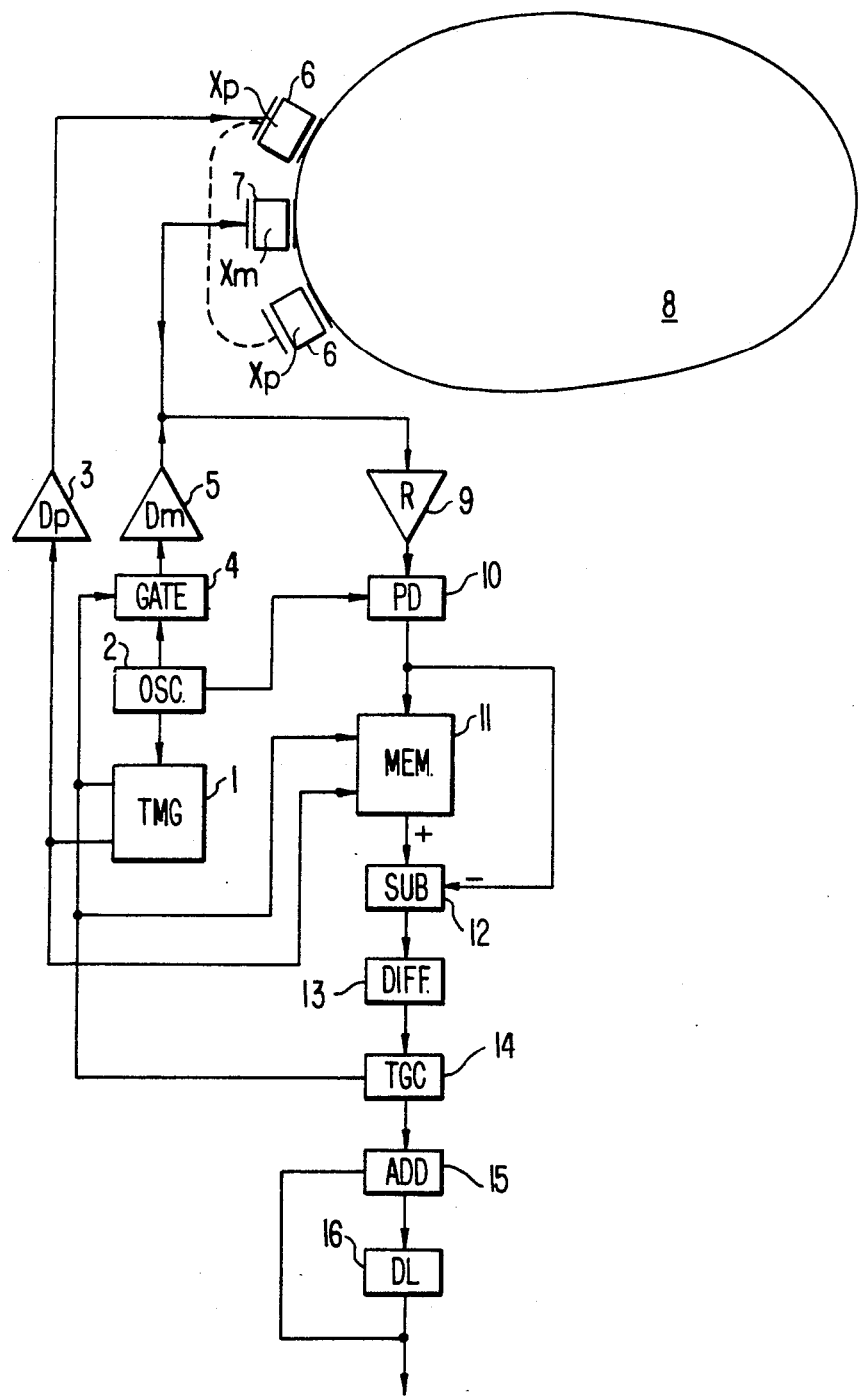

An example of an embodiment of a system utilizing this method is shown in FIG. 10. In FIG. 10, the same component elements as those in FIG. 6A are given the same numbering and further explanation of these is omitted. In FIG. 10, 16 is a delay circuit which delays the signal by the repetition period T of transmission of the pumping signal. For example, it can also be realized by an analogous means such as BBD and CCD, etc. or by a digital means combining an A/D converter and a shift register or a random access memory. 15 is an adder which may be any type of analogous or digital means in accordance with a kind of delay circuit.

In the case of the embodiment shown in FIG. 10, it is apparent that an output of the TGC circuit 14 is added for each point of the same A-axis coordinate and the S/N can be improved by the so-called synchronous addition.

In this invention, the two- or three-dimensional distribution of B/A (Z) can be obtained. As is apparent from the above description, the distribution of B/A (Z) on the particular scanning line can be obtained. Therefore, the two- or three-dimensional distribution of B/A (Z) can be obtained by moving the transducer 6 for the pumping pulse and the transducer 7 for the measuring pulse in the direction(s) x or/and y and storing the value in the memory address B/A (Z) corresponding to the x or/and y coordinate, while the relative position of said transducers in kept constant.

Figure 11:
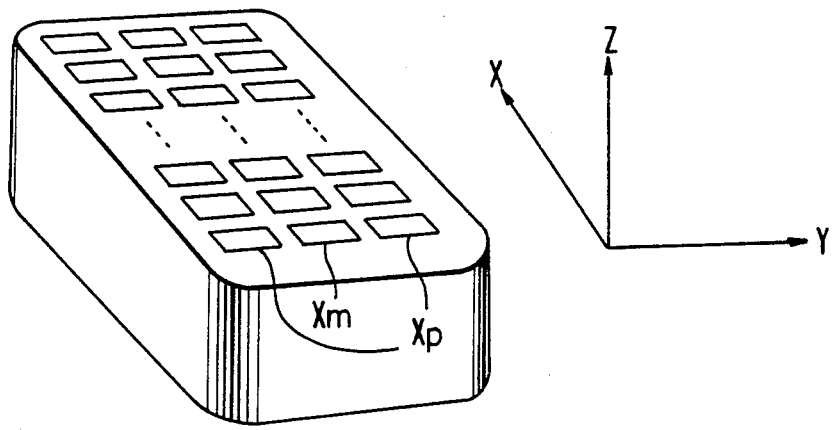
FIGS. 11 to 13 show the perspective views of the structure of the transducer.

For example, as shown in FIG. 11, it is obvious that the two-dimensional distribution of B/A (Z) can be obtained easily by utilizing a transducer wherein the transducers $x_p$ for the pumping pulse and the transducers $x_m$ for measuring pulse are respectively arrayed, and by executing the electronic scanning in the direction x. Moreover, it is also clear that the three-dimensional distribution of B/A (Z) can also be obtained easily by utilizing, for example, the transducer array having the constitution as shown in FIG. 12, through expansion of the transducer array of FIG. 11 in the direction of the y axis.

Figure 12:
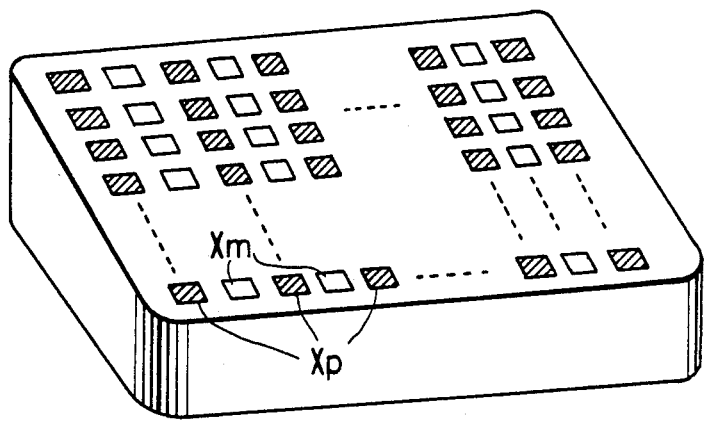

In the above description, the transducer array shown in FIG. 11 or FIG. 12 is used for obtaining the two-dimensional or three-dimensional distribution of B/A (Z), but it is a matter of course that the two- or three-dimensional distribution of B/A (Z) may be obtained through single or two-dimensional mechanical scanning of the transducer as shown in FIG. 6(b).

Figure 13:
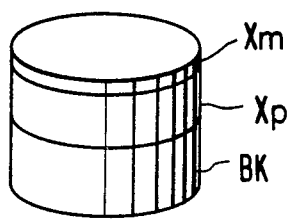

In the above explanation, the transducer for the pumping pulse and that for the measuring pulse are provided adjacently in the lateral direction. However, as shown in FIG. 13, the transducer $X_p$ for the pumping pulse and the transducer $X_m$ for the measuring pulse may be stacked. In this case, the so-called PVDF which is flexible and has an acoustic impedance similar to that of a living tissue is used, for example, as the transducer $X_m$ for the measurement of FIG. 13, and a so-called PZT which is hard and has a large acoustic impedance is used, for example, as the transducer $X_p$ for the pumping pulse. Thus a very convenient transducer structure is produced to have the advantages that the pumping pulse can be transmitted through the PVDF layer almost without attenuation, and moreover that the PZT layer works as the backing for the PVDF layer. BK is a backing material.

Further, different transducers for measurement may be used for transmission and reception.

Figure 14:
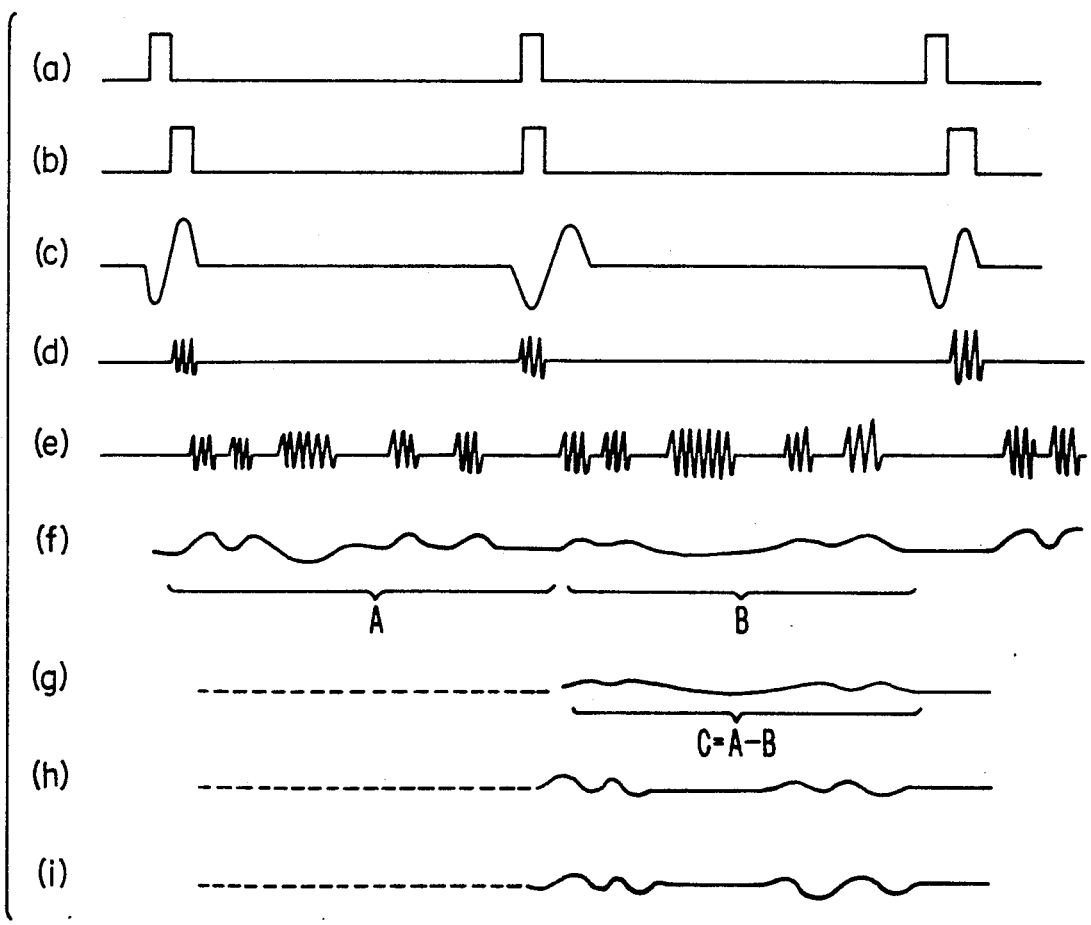
FIGS. 14(a) to 14(i) show waveforms for explaining another embodiment of this invention.

Moreover, in the above embodiment, the difference is obtained in the received signals when the burst pulse for transmission is superposed on the peak (or trough) of the pumping pulse and when only the burst pulse is transmitted while the pumping is not transmitted, but as shown by the waveforms of FIGS. 14(a) to 14(i) the measuring sensitivity can be doubled by obtaining a difference of the receiving signals when the burst pulse is superposed on the peak of the pumping pulse and when it is superposed on the trough of the pumping pulse. As shown in FIG. 14(f), the effect of the sound pressure P of the pumping pulse works inversely in the sections A and B. Therefore an output as in FIG. 14(g) is doubled as compared with that of FIG. 7(g) by taking their difference. The means for realizing this is almost the same as FIG. 6(a), FIG. 8 and FIG. 10, and there is little difference in the generation of the timing pulse of FIG. 14(a) for the pumping pulse.

We claim:

1. An ultrasonic measuring system for a non-linear parameter of an ultrasonic medium, said system comprising transmitting and receiving means for transmitting ultrasonic pulses along axis for measurement, for generating and transmitting ultrasonic pulses for pumping, of comparatively lower wave frequency and higher sound pressure than said ultrasonic pulses for measurement, into said medium along substantially the same axis as said ultrasonic pulses for measurement, for receiving ultrasonic waves reflected from said medium corresponding to said ultrasonic pulses for measurement, and for providing an output corresponding to each of the respective received ultrasonic reflected waves, control means for controlling the timing of said transmitting of said ultrasonic pulses for measurement and pumping so that a respective one of said ultrasonic pulses for measurement is superposed on at least one respective predetermined phase of said ultrasonic pulses for pumping, phase detection means for receiving said output of said transmitting means and for providing an output corresponding to the respective phase of each said reflected ultrasonic wave, and spatial distribution determining means for providing an output corresponding to a spatial distribution of said non-linear parameter of said ultrasonic medium along said axis by differentiating said output of said phase detection means.

2. The system of claim 1, wherein said transmitting and generating means and said control means includes means for transmitting respective ones of said ultrasonic pulses for measurement when said ultrasonic pulses for pumping are not produced, to provide respective ones of said reflected ultrasonic waves to said phase detection means for providing said output corresponding to the respective phase, and said output of said phase detection means corresponds to the difference in phase of said reflected sound waves as between when respective ones of said ultrasonic pulses for measurement are superimposed with said ultrasonic pulses for pumping and when only respective ones of the ultrasonic pulses for measurement are transmitted, wherein said spatial distribution determining means differentiates said output corresponding to said difference in phase to provide said output corresponding to the spatial distribution of said non-linear parameter in said medium.

3. An ultrasonic measuring system for a non-linear parameter of an ultrasonic medium, said system comprising transmitting and receiving means for transmitting ultrasonic pulses for measurement along an axis into said medium, for transmitting ultrasonic pulses for pumping, of lower wave frequency and higher sound pressure than said ultrasonic pulses for measurement, into said medium along substantially the same axis as said ultrasonic pulses for measurement, for receiving respective ultrasonic waves reflected from said medium corresponding to said pulses for measurement, and for providing an output corresponding to each of the respective received reflected ultrasonic waves, control means for controlling the timing of said transmitting of said ultrasonic pulses for measurement and pumping so that respective ones of said ultrasonic pulses for measurement are transmitted superposed on a respective predetermined phase of said ultrasonic pulses for pumping and other respective ones of said ultrasonic pulses for measurement are transmitted when said ultrasonic pulses for pumping are not transmitted, difference means for providing an output corresponding to phase difference between said output of said transmitting means corresponding to the reflected waves when respective ones of the ultrasonic pulses for measurement are superposed with said ultrasonic pulses for pumping and said output of said transmitting means corresponding to the reflected waves for respective ones of the ultrasonic pulses for measurement that are transmitted when the ultrasonic pulses for pumping are not transmitted, and means for obtaining the respective spatial distribution of said non-linear parameter of said medium by differentiating said output of said difference means.

4. An ultrasonic system for measuring a non-linear parameter of an ultrasonic medium, said system comprising, transducer means for transmission along an axis of ultrasonic pulses for measurement into said medium, for transmitting ultrasonic pulses for pumping, of lower wave frequency and higher sound pressure than said ultrasonic pulses for measurement, into said medium substantially along the same axis as said ultrasonic pulses for measurement, for receiving ultrasonic waves reflected from said medium corresponding to said ultrasonic pulses for measurement, and for providing an output corresponding to each of the respective received reflected waves, means for controlling the timing of energization of said transducer means so that respective ones of said pulses for measurement are superposed on respective different phases of said ultrasonic pulses for pumping, means for providing a signal corresponding to the respective phases of the received reflected ultrasonic waves from said medium corresponding to each said ultrasonic pulse for measurement, from said output of said transducer means, and for obtaining a signal corresponding to the difference between respective different ones of said phases of the respective received ultrasonic waves corresponding to the ultrasonic pulses for measurement associated with said respective different phases of the ultrasonic pulses for pumping, and for obtaining the spatial distribution of said non-linear parameter along the direction of said axis in said medium by differentiating said signal corresponding to said difference.

5. An ultrasonic system for measuring a non-linear parameter in an ultrasonic medium, said system comprising transducer means for transmitting along an axis ultrasonic pulses for measurement, into the medium, for transmitting ultrasonic pulses for pumping, of lower wave frequency and higher sound pressure than said ultrasonic pulses for measurement, substantially along the same axis as said ultrasonic pulses for measurement, for receiving ultrasonic waves reflected from said medium, corresponding to said ultrasonic pulses for measurement, and for outputting an RF signal corresponding to each of said reflected waves, means for controlling the timing of energization of said transducer means so that respective ones of said ultrasonic pulses for measurement are transmitted superposed on at least two respective different phases of said ultrasonic pulses for pumping, means for providing, by phase comparison between said RF signals corresponding to said reflected waves, a signal corresponding to the phase difference between said reflected waves corresponding to said ultrasonic pulses for measurement being transmitted superposed on the respective different phases of said ultrasonic pulses for pumping, and for obtaining the spatial distribution along the direction of said axis said non-linear parameter of said medium by differentiating said signal corresponding to said phase difference.

6. An ultrasonic non-linear parameter measuring system according to claim 5, wherein said respective different phases include respective positive and negative sound pressure portions of said ultrasonic pulses for pumping.

7. The system of claim 4, 5 or 6, wherein said first and second transducer means is integrally formed.

8. A system for determining the distribution characteristic of a non-linear parameter in a medium, comprising emitting and receiving means for emitting into said medium ultrasound pulses for measurement and ultrasound pulses for pumping along substantially the same axis, the latter pulses having lower wave frequency and higher sound pressure than the former, at least some respective ones of the former being produced (1) to be superposed on a first phase of the latter at least at a first time and others (2) at another respective time, for receiving respective ultrasound waves reflected from the medium and for providing an output signal corresponding to each said reflected wave, and phase means for determining a signal corresponding to the phase difference between said output signals corresponding to said received signals of said reflected waves corresponding to (1) and (2) above, respectively, and for taking the differential of said signal corresponding to said phase difference to provide an output corresponding to said distribution characteristic of said non-linear parameter along said axis in said medium.

9. The system of claim 8, wherein said phase means includes phase detection means for detecting the phase of each said received signal and for providing respective outputs as said output signals corresponding to said received signals.

10. The system of claim 8, wherein said signals corresponding to said received signals are said received signals.

11. The system of claim 8, 9 or 10 wherein said another respective time of (2) above is for a further different phase of respective ones of said ultrasound pulses for pumping.

12. The system of claim 8, 9 or 10, wherein said another respective time of (2) above is a time when said ultrasound pulses for pumping are not being transmitted by said emitting and receiving means.

* * * * *